June 12, 1951 G. D. BERDAN 2,556,790
COMBINED LAWN MOWER AND EDGE TRIMMER
Filed Sept. 8, 1947

GEORGE D. BERDAN
INVENTOR

BY *Herbert J. Brown*
ATTORNEY

Patented June 12, 1951

2,556,790

UNITED STATES PATENT OFFICE 2,556,790

COMBINED LAWN MOWER AND EDGE TRIMMER

George D. Berdan, Fort Worth, Tex.

Application September 8, 1947, Serial No. 772,759

3 Claims. (Cl. 56—25.4)

1

This invention relates to mowing apparatus, and has reference to a power driven lawn mower.

An object of the invention is to provide a mower of the referred to class which not only mows grass on a horizontal plane, but one which is capable of trimming the edges of a lawn, as at the curbstone or walk.

Another object of the invention is to provide, in addition to the foregoing, a mower which is capable of trimming grass close to the wall of a house or other vertical structure.

A further object of the invention is to provide a lawn mower of the rotary cutting disk type having a clutch mechanism whereby teeth of the device will not break when contact is inadvertently made against rocks, stubs, or other obstructions.

These and other objects will become apparent from the following description of the accompanying drawings, wherein.

Figure 1:
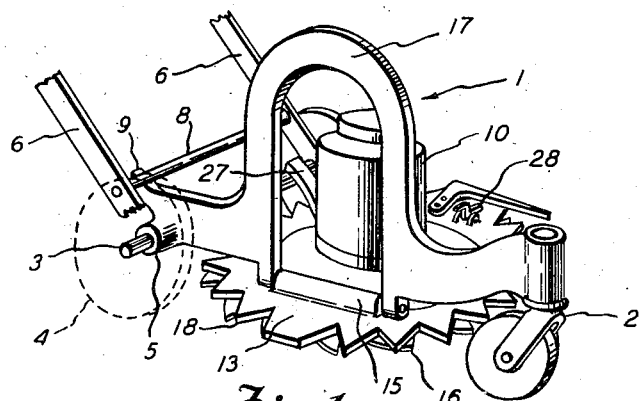
Figure 1 is a perspective view of an exemplary form of the invention.

Accordingly, the form of the invention shown includes a frame 1 supported at its front end by a caster 2 and at its rear end by an axle 3 journaled therethrough and wheels 4 at each end of the said axle. It will be noted, as in Figure 1, the bearing 5 for the axle 3 is relatively long for maintaining axle alignment. Parallel arms 6 are journaled on the axle 3 and are joined at their upper ends by a handle 7, whereas the lower end of the arms 6 are provided with a cross member or bar 8 relatively close to the axle bar 5. A rearwardly and upwardly projecting lug 9 is integral with the frame 1 as shown in Figure 1, and upon which the lower handle cross member or bar 8 rests. The last referred to arrangement of lugs 9 and cross bar 8 is for lifting the front of the frame 1 when desired by applying weight on the upper cross member or handle 7.

The apparatus is provided with an electric motor 10 which is supplied by a line 11, and which line is provided with a switch 12.

Figures 4, 5:
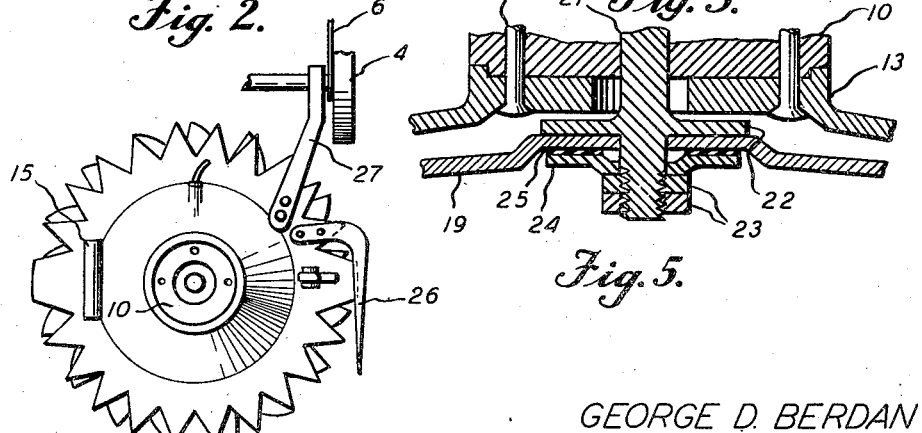
Figure 4 is a plan view of the stationary and rotating blades or disks of the device, and additionally showing the side attachment for trimming close to vertical structures, together with a portion of the axle and the supporting arm attached to the said stationary blade.
Figure 5 is a vertical fragmentary sectional view of the centers of the stationary blade and rotating blade, and showing the construction and arrangement of a clutch mechanism for preventing the breaking of teeth in the periphery of the said rotating blade.

The motor 10 is mounted on a stationary disk 13 and secured by means of bolts 14, as shown in Figure 5. An elongated boss 15 is integral with the surface of the disk 13, as shown in Figure 1, and is provided with a hinge pin 16 therethrough. The intermediate portion of the frame 1 is in the form of an inverted U, indicated by the numeral 17, and the lower ends of which project to receive the ends of the hinge pin 16.

The periphery of the stationary disk 13 is provided with teeth 18. Similarly, there is another disk 19 having teeth 20 in its periphery, and which blade or disk is rotatably driven by the motor 10. As shown in Figure 5, the motor shaft 21 is provided with a flange 22 and against which the center of the rotating disk 19 is positioned. The outer end of the motor shaft 21 is threaded to receive lock nuts 23 which retain a bearing washer 24 and a clutch plate 25. By reason of the last described arrangement, the rotating disk 19 is frictionally secured in place so as to protect the teeth 20 at its periphery.

Secured to one side of the stationary disk 13 there is an angular and forwardly projecting guide 26 which projects outwardly of the sets of teeth 18 and 20 so as to protect the latter and to allow the apparatus to be operated close to a vertical structure.

For horizontal operation of the rotating blade or disk 19 there is an arm 27 secured to the upper surface of the stationary blade 13 and which arm extends to and rests upon the axle 3, as particularly shown in Figure 1.

The structure described enables the stationary disk 13, the motor 10, and the attached rotating blade 19 to be tilted to a position whereby the rotating blade 19 may be operated vertically. When so positioned, the inverted U 17 of the frame 1 accommodates the motor 10, as shown by means of dotted lines in Figure 2, and a latch 28 on the stationary disk 13 is caused to engage the U portion 17 of the frame 1 for maintaining the rotating blade 19 in its vertical position.

Figures 2, 3:
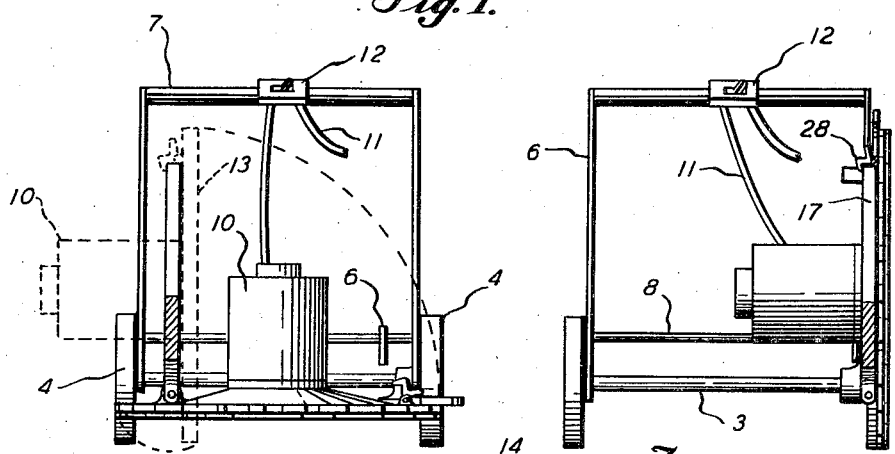
Figure 2 is a rear elevational view of the mower illustrated in Figure 1 and showing the same positioned for horizontal operation, as when mowing the surface of a lawn.
Figure 3 is a view similar to Figure 2, but showing the mower positioned for operation as a lawn trimming device.

After tilting the motor and attached parts, as shown in Figure 2, the frame 1 is slidably moved on the axle 3 to the side of the apparatus, as shown in Figure 3, for trimming outwardly of the path of the supporting wheels 4.

The described form of the invention is not restrictive, but the same may be employed in many ways within the scope of the appended claims.

What is claimed is:

1. In a combined lawn mower and edge trimmer, the combination of: an axle having wheels mounted on each end thereof, a frame slidably mounted along the length of said axle and between said wheels, a support hingedly attached to said frame and on an axis substantially perpendicular to the length of said axle, and a driven disk cutter carried by said support.

2. In a combined lawn mower and edge trimmer, the combination of: a frame having wheels on the sides thereof, a support slidably mounted between said wheels and in a direction parallel with the axes thereof, a driven cutter disk mounted on said support, and a hinge connecting said support with said frame, the axis of said hinge being substantially perpendicular to the axes of said wheels.

3. In a combined lawn mower and edge trimmer, the combination of: a frame having wheels on the sides thereof, a support slidably mounted between said wheels and in a direction parallel with the axes thereof, a driven cutter disk mounted on said support, a hinge connecting said support with said frame, the axis of said hinge being substantially perpendicular to the axes of said wheels, and an angularly and forwardly directed guard mounted on one side of said support and extending beyond the periphery of said cutter disk.

GEORGE D. BERDAN.

REFERENCES CITED

The following references are of record in the file of this patent:

UNITED STATES PATENTS

| Number | Name | Date |
| --- | --- | --- |
| Re. 21,274 | Orr | Nov. 21, 1939 |
| 1,189,519 | Word | July 4, 1916 |
| 2,365,408 | Hillyer | Dec. 19, 1944 |
| 2,410,196 | Benthall | Oct. 29, 1946 |